United States Patent
Yang et al.

(10) Patent No.: US 7,197,007 B2
(45) Date of Patent: Mar. 27, 2007

(54) METHOD FOR GENERATING 2D OVSF CODES IN MULTICARRIER DS-CDMA SYSTEMS

(75) Inventors: Guu-Chang Yang, Nan-Tun Ward (TW); Chia-Ming Yang, Taipei Hsien (TW); Pei-Hsuan Lin, Tai-Chung Hsien (TW)

(73) Assignee: Accton Technology Corporation, Hsin-Chu (TW)

( * ) Notice: Subject to any disclaimer, the term of this patent is extended or adjusted under 35 U.S.C. 154(b) by 1036 days.

(21) Appl. No.: 10/063,771

(22) Filed: May 11, 2002

(65) Prior Publication Data

US 2003/0210647 A1    Nov. 13, 2003

(51) Int. Cl.
*H04J 11/00* (2006.01)
(52) U.S. Cl. .................................. 370/208
(58) Field of Classification Search .......... 370/208, 370/335, 342
See application file for complete search history.

(56) References Cited

U.S. PATENT DOCUMENTS

| | | | | |
|---|---|---|---|---|
| 6,975,615 | B1* | 12/2005 | Toskala et al. | 370/342 |
| 2002/0006156 | A1* | 1/2002 | Belaiche | 375/130 |
| 2002/0102981 | A1* | 8/2002 | Jechoux | 455/450 |
| 2003/0058788 | A1* | 3/2003 | Kim et al. | 370/208 |

OTHER PUBLICATIONS

Title: On the Capacity of a Cellular CDMA System (From: IEEE Transactions on Vehicular Technology, vol. 40, No. 2, May 1991) pp.: 302-312, Total 11 Pages. Author: Klein S. Gilhausen, Irwin M. Jacobs, Roberto Padovani, Andrew J. Viterbi, Lindsay A. Weaver,Jr., Charles E. Wheatley.

Title: Wideband DS-CDMA for Next-Generation Mobile Communications Systems (From: IEEE Communications Magazine, Sep. 1998) pp.: 56-69, Total 14 Pages. Author: Fumiyuki Adachi, Mamoru Sawahashi, Hirohito Suda.

Spreading Codes for Direct Sequence CDMA and Wideband CDMA Cellular Networks (From: IEEE Communications Magazine Sep. 1998) pp.: 48-50, Total 7 Pages. Author: Esmael H. Dinan and Bijan Jabbari.

Title: UMTS/IMT-2000 Based on Wideband CDMA (From: IEEE Communications Magazine Sep. 1998) pp.: 70-80, Total 11 Pages. Author: Erik Dahlman, Björn Gudmundson, Mats Nilsson, and Johan Sköld.

Title: Performance of Multicarrier DS CDMA Systems (From: IEEE Transactions on Communications, Vol. 44, No. 2, Feb. (1996) pp.: 238-246, Total 9 Pages. Author: Shira Kondo and Laurènce B. Mulstein.

Title: Performance of Orthogonal Multicarrier CDMA in a Multipath Fading Channel From: IEEE Transactions on Communications, vol. 44, No. 3, Mar. 1996 pp.: 356-367, Total 12 pages. Author: Essam A. Sourour, and Masao Nakagawa.

(Continued)

*Primary Examiner*—Derrick Ferris
(74) *Attorney, Agent, or Firm*—Winston Hsu

(57) ABSTRACT

A code tree of two-dimensional orthogonal variable spreading factor (2D-OVSF) code matrices for a multicarrier direct-sequence code-division multiple-access (MC-DS/CDMA) communications system is generated by providing two sets of 2×2 orthogonal matrices $\{A^{(1)}_{(2\times2)}, A^{(2)}_{(2\times2)}\}$ and $\{B^{(1)}_{(2\times2)}, B^{(2)}_{(2\times2)}\}$. The first set of 2×2 matrices is used to generate a pair of sibling nodes in the code tree that respectively represent matrices $A^{(1)}_{(2\times2^\alpha)}$ and $A^{(2)}_{(2\times2^\alpha)}$ by iterating the relationship:
$A^{(1)}_{(2\times2^{1+\beta})}=[A^{(1)}_{(2\times2^\beta)} A^{(2)}_{(2\times2^\beta)}]$, The matrices $A^{(1)}_{(2\times2^\alpha)}$ and $A^{(2)}_{(2\times2^\alpha)}$ are
$A^{(2)}_{(2\times2^{1+\beta})}=[A^{(1)}_{(2\times2^\beta)} -A^{(2)}_{(2\times2^\beta)}]$.
used to generate a child node of one of the sibling nodes. The child node contains an M×N matrix, which is found by iterating the relationship:
$A^{(i-1)}_{(O\times P)}=[B^{(1)}_{(2\times2)} A^{(i/2)}_{(O/2\times P/2)}]$ where indicates a Kronecker product.
$A^{(i)}_{(O\times P)}=[B^{(2)}_{(2\times2)} A^{(i/2)}_{(O/2\times P/2)}]$,

13 Claims, 17 Drawing Sheets

OTHER PUBLICATIONS

Asynchronous Multicarrier DS-CDMA Using Mutually Orthogonal Complementary Sets of Sequences. From: IEEE Transactions on Communications, vol. 48, No. 1, Jan. 2000 pp.: 53-59, Total 7 Pages. Author: Shu-Ming Tseng, and Mark R. Bell.

Title: A Multicarrier CDMA Architecture Based on Orthogonal Complementary Codes for New Generations of Wideband Wireless Communications. From: IEEE Communications Magazine. Oct. 2001 Author: Hstao-Hwa Chen, Jun-Feng Yeh, and Naoki Suehiro pp.: 126-135, Total 10 Pages.

Title: Complementary Sets of Sequences From: IEEE Transactions on Information Theory, vol. 11-18, No. 5, Sep. 1972. pp.: 644-652, Total 9 Pages. Author: C-C- Tseng, and C.L. Liu.

Title: N-Shift Cross-orthogonal Sequences From: IEEE Transactions on Information Theory, vol. 34, No.1, Jan. 1988. pp.: 143-146, Total 4 pages. Author: N. Suehiro, and M. Hatori.

Title: Tree-Structured Generation of Orthogonal Spreading Codes with Different Lengths for Forward Link of DS-CDMA Mobile radio From: Electronics letters Jan. 2, 1997 vol. 33 No. 1 pp.: 27-28, Total 2 pages. Author: F. Adachi, M. Sawahashi and K. Okawa.

* cited by examiner $$A^{(1)}_{2\times2} = \begin{bmatrix} + & + \\ + & - \end{bmatrix}$$

Fig. 3A $$A^{(2)}_{2\times 2} = \begin{bmatrix} + & - \\ + & + \end{bmatrix}$$

Fig. 3B $$\mathbb{B}^{(1)}_{2\times 2} = \begin{bmatrix} + & + \\ + & - \end{bmatrix}$$

Fig. 3C $$\mathbb{A}^{(1)}_{2\times 4} = \begin{bmatrix} + & + & + & - \\ + & - & + & + \end{bmatrix}$$

Fig. 4A $$\mathbb{A}^{(2)}_{2\times 4} = \begin{bmatrix} + & + & - & + \\ + & - & - & - \end{bmatrix}$$

Fig. 4B $$A \otimes B = \begin{bmatrix} a_{0,0}B & a_{0,1}B & \ldots & a_{0,N-1}B \\ a_{1,0}B & a_{1,1}B & \ldots & a_{1,N-1}B \\ \vdots & \vdots & & \\ a_{M-1,0}B & a_{M-1,1}B & \ldots & a_{M-1,N-1}B \end{bmatrix}$$

Fig. 5

$$\mathbb{A}^{(1)}_{4\times 4} = \left[ \mathbb{A}^{(1)}_{2\times 2} \otimes \mathbb{A}^{(1)}_{2\times 2} \right] = \begin{bmatrix} + & + & + & + \\ + & - & + & - \\ + & + & - & - \\ + & - & - & + \end{bmatrix}$$

Fig. 6A $$\mathbb{A}^{(2)}_{4\times 4} = \left[ \mathbb{A}^{(2)}_{2\times 2} \otimes \mathbb{A}^{(1)}_{2\times 2} \right] = \begin{bmatrix} + & + & - & - \\ + & - & - & + \\ + & + & + & + \\ + & - & + & - \end{bmatrix}$$

Fig. 6B $$\mathbb{A}^{(3)}_{4\times 4} = \left[ \mathbb{A}^{(1)}_{2\times 2} \otimes \mathbb{A}^{(2)}_{2\times 2} \right] = \begin{bmatrix} + & - & + & - \\ + & + & + & + \\ + & - & - & + \\ + & + & - & - \end{bmatrix}$$

Fig. 6C $$\mathbb{A}^{(4)}_{4\times 4} = \left[ \mathbb{A}^{(2)}_{2\times 2} \otimes \mathbb{A}^{(2)}_{2\times 2} \right] = \begin{bmatrix} + & - & - & + \\ + & + & - & - \\ + & - & + & - \\ + & + & + & + \end{bmatrix}$$

Fig. 6D

METHOD FOR GENERATING 2D OVSF CODES IN MULTICARRIER DS-CDMA SYSTEMS

BACKGROUND OF INVENTION

1. Field of the Invention

The present invention relates to code-division multiple-access (CDMA) communications systems. More specifically, two-dimensional orthogonal variable spreading factor (2D-OVSF) codes for a multicarrier direct-sequence CDMA system are disclosed.

2. Description of the Prior Art

The enormous market penetration of second-generation (2G) mobile communications systems, and the promise of expanded features for these devices, has spurred the demand for transmission/reception strategies that are capable of ever-greater data transmission rates. This has lead to the development of so-called third-generation (3G) mobile communications, such as the 2 Mbps wideband code-division multiple-access (W-CDMA) service proposed by the International Mobile Telecommunications 2000 (IMT-2000) body. CDMA technology is used in 3G mobile communications to provide wideband services in a flexible manner. Through spectrum spreading, CDMA systems offer spectrum reuse, multipath resistance, frequency diversity and interference rejection.

To support both high-speed and multirate data services, two approaches are used in an IMT-2000 W-CDMA system: variable-length spreading and multicode techniques. Variable-length spreading CDMA uses multiple spreading factors for multirate transmissions, whereas multicode CDMA allocates multiple codes to high data rate services. The two-layered spreading method is used in W-CDMA to provide mutual orthogonality between users of the same cell, while maintaining mutual randomness between users of different cells. The two-layered spreading method has two parts. The first is channelization, which transforms every data symbol into a predetermined number of chips. The number of chips per data symbol is termed the spreading factor. Orthogonal variable spreading factor (OVSF) codes are employed as channelization codes to ensure orthogonality between different downlink channels. The second part is scrambling. Each user in the same cell uses the same scrambling code to provide randomness (or, rather, pseudo-randomness) between users of different cells. However, orthogonal variable spreading factor (OVSF) codes cannot maintain orthogonality among users in the uplink channels. Therefore, users in the same cell use different scrambling codes to provide randomness and orthogonality in uplink channels.

However, for even greater data transmission capabilities, multicarrier direct-sequence CDMA (MC-DS/CDMA) systems have been proposed. MC-DS/CDMA communications systems using orthogonal spreading codes have an advantage in that they minimize multiple-access interference (MAI), which is one of the primary sources of Interference in CDMA systems. By reducing MAI, greater transmission data rates are made possible. Each user in a MC-DS/CDMA system is assigned a distinct two-dimensional (2D) spreading code sequence in the form of a matrix, which serves as the signature sequence for the user. The number of columns in the matrix indicates the spreading factor utilized (i.e., the number of chips per data symbol). The number of rows in the matrix indicates the number of frequency carriers in the MC-DS/CDMA system. Each row of the matrix is transmitted along different frequency carriers. It is possible to construct a class of 2D spreading code matrices for MC-DS/CDMA systems that exhibit cyclic autocorrelation sidelobes and cyclic cross-correlation functions that are at most zero at all times. As MAI is primarily the result of non-zero cross-correlation functions of simultaneously transmitting users, by providing such unique spreading code matrices, MAI can be significantly reduced In MC-DS/CDMA communications systems. Please refer to FIG. 1A and FIG. 1B. FIG. 1A is a simple block diagram of a MC-DS/CDMA communications system 10 according to the prior art. FIG. 1B Illustrates an M×N spreading code matrix 14a utilized by the communications system 10. Input data 12a feeds into a multiplier 14, which spreads the spectrum through the assignment of unique signature M×N spreading code matrix 14a. Data after spreading spectrum 15 is then fed into a multicarrier modulation unit 16 and transmitted. On a receiver side, a multicarrier demodulation unit 17 receivers the transmitted signal and demodulates it to generate the demodulated data 18. A multiplier 19 multiplies the data 18 by the same M×N spreading code matrix 14a to generate output data 12b. Typically, the M×N spreading code matrices of all users are identical,and ideally the output data 12b should match the input data 12a.

To date, however, MC-DS/CDMA spreading code matrices have been very limited in form, being M×N with the following restrictions:

$$M=N=2^k, \text{ with } k \geq 1, \text{ or} \quad 1)$$

$$M=2^k, \text{ and } N=M^2, \text{ with } k \geq 1. \quad 2)$$

This places a corresponding restriction on MC-DS/CDMA communications systems that severely limits the potential flexibility of these systems as regards data transmission parameters.

SUMMARY OF INVENTION

It is therefore a primary objective of this invention to provide multicarrier direct-sequence code-division multiple-access (MC-DS/CDMA) communications systems that have the ability to generate, and hence use, generalized two-dimensional (2D) orthogonal variable spreading factor (2D-OVSF) codes having the form of an M×N matrix where $M=2^k$ and $N=2^l$, with $1 \geq k \geq 1$.

Briefly summarized, the preferred embodiment of the present invention discloses a method for wireless communications. A multicarrier direct-sequence code-division multiple-access (MC-DS/CDMA) communications system is provided. A code tree of two-dimensional orthogonal variable spreading factor (2D-OVSF) codes is then generated for the system. Each node of the code tree has a corresponding matrix that is representative of a spreading code sequence. An M×N matrix from a node of the code tree is selected, where M relates to the number of available frequency carriers in the MC-DS/CDMA system, N relates to a spreading factor code length, $M=2^k$, $N=2^{k+\alpha}$, k is greater than zero, and α is greater than or equal to zero. The M×N matrix is then assigned to a user of the MC-DS/CDMA system to serve as a signature sequence of the user. To generate the code tree, two sets of 2×2 orthogonal matrices $$\{A^{(1)}_{(2\times 2)}, A^{(2)}_{(2\times 2)}\} \text{ and } \{B^{(1)}_{(2\times 2)}, B^{(2)}_{(2\times 2)}\}$$

are provided. The first and second 2×2 matrices are used to generate pairs progenitor nodes in the code tree that respectively represent matrices $A^{(1)}_{(2\times 2^{\alpha})}$, and $A^{(2)}_{(2\times 2^{\alpha})}$, by iterating the relationship:

$$A^{(1)}_{(2\times 2^{1+\beta})}=[A^{(1)}_{(2\times 2^{\beta})} A^{(2)}_{(2\times 2^{\beta})}],$$

$$A^{(2)}_{(2\times 2^{1+\beta})}=[A^{(1)}_{(2\times 2^{\beta})} -A^{(2)}_{(2\times 2^{\beta})}].$$

The matrices $A^{(1)}_{(2\times 2^{\alpha})}$, and $A^{(2)}_{(2\times 2^{\alpha})}$ are used to generate a child node of one of the progenitor nodes. The child node contains the M×N matrix, which is found by iterating the relationship:

$$A^{(i-1)}_{(O\times P)}=[B^{(1)}_{(2\times 2)} A^{(i/2)}_{(O/2\times P/2)}]$$

$$A^{(i)}_{(O\times P)}=[B^{(2)}_{(2\times 2)} A^{(i/2)}_{(O/2\times P/2)}],$$

where indicates a Kronecker product, and i=2, 4, 6, 8, etc.

The construction of 2D OVSF codes according to the present invention requires at most two sets of 2×2 orthogonal matrices $$\{A^{(1)}(2\times 2), A^{(2)}(2\times 2)\} = \{B^{(1)}(2\times 2), B^{(2)}(2\times 2)\} = \left\{ \begin{bmatrix} + & + \\ + & - \end{bmatrix}, \begin{bmatrix} + & - \\ + & + \end{bmatrix} \right\}.$$

In particular, the two sets of 2×2 orthogonal matrices can be the same. As an example, $$\{A^{(1)}_{(2\times 2)}, A^{(2)}_{(2\times 2)}\} = \{B^{(1)}_{(2\times 2)}, B^{(2)}_{(2\times 2)}\} = \left( \begin{bmatrix} + & + \\ + & - \end{bmatrix}, \begin{bmatrix} + & - \\ + & + \end{bmatrix} \right).$$

Construction of 2D OVSF codes can thus be achieved by one set of 2×2 orthogonal matrices. In short, the entire set of 2D OVSF codes according to the present invention can be constructed by any set of 2×2 orthogonal matrices.

It is an advantage that the present invention provides a new class of 2D-OVSF codes that offers greater variability between the relative dimensions of the columns and rows of the associated matrices, and hence permits a MC-DS/CDMA system greater flexibility In the choice of the number of carrier frequencies and the spreading factor utilized.

It is a further advantage of the present invention that the 2D-OVSF codes can be generated recursively by using a tree structure that is analogous to 1D-OVSF codes.

Similarly, multirate transmissions can be completed by variable-length spreading and multicode techniques when 2D OVSF codes as obtained by the present invention are used in MC-DS/CDMA systems. It is yet another advantage that the present invention 2D-OVSF codes possess zero cyclic auto-correlation and cross-correlation properties. The present invention 2D OVSF codes are thus capable of remaining orthogonal in asynchronous channels, and so a two-layered spreading technique is not necessarily needed.

These and other objectives of the present invention will no doubt become obvious to those of ordinary skill in the art after reading the following detailed description of the preferred embodiment, which is illustrated in the various figures and drawings.

BRIEF DESCRIPTION OF DRAWING

FIGS. 3A to 3D depict initial orthogonal matrices.

FIGS. 4A and 4B depict matrices associated with progenitor node pairs of the code tree of FIG. 2.

FIG. 5 shows the Kronecker product of two matrices.

FIGS. 6A–6D illustrate matrices for 2D-OVSF codes constructed according to the present invention.

DETAILED DESCRIPTION

Figure 1A:
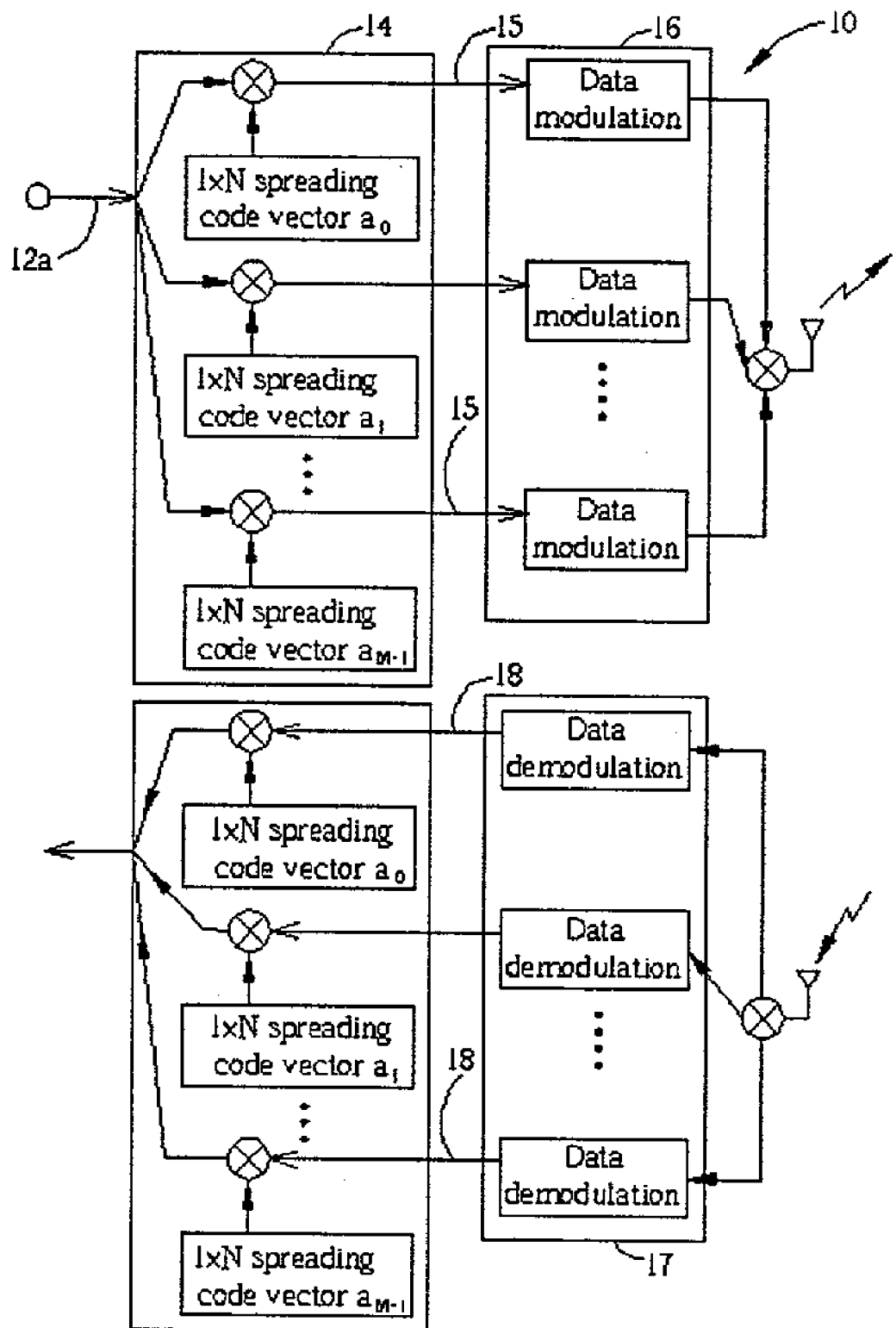
FIG. 1A is a simple block diagram of a multicarrier direct-sequence code-division multiple-access (MC-DS/CDMA) communications system according to the prior art.
Figure 1B:
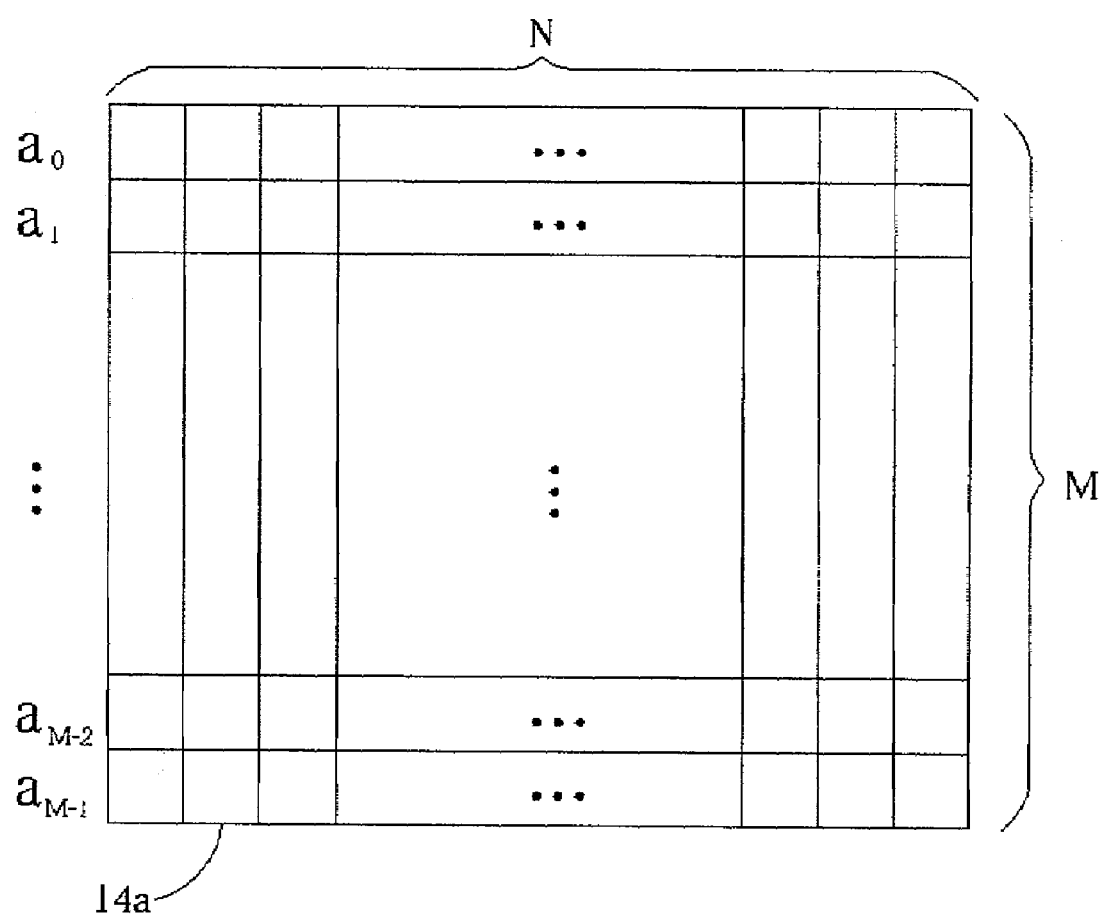
FIG. 1B shows a matrix utilized by the communications system of FIG. 1A.
Figure 2:
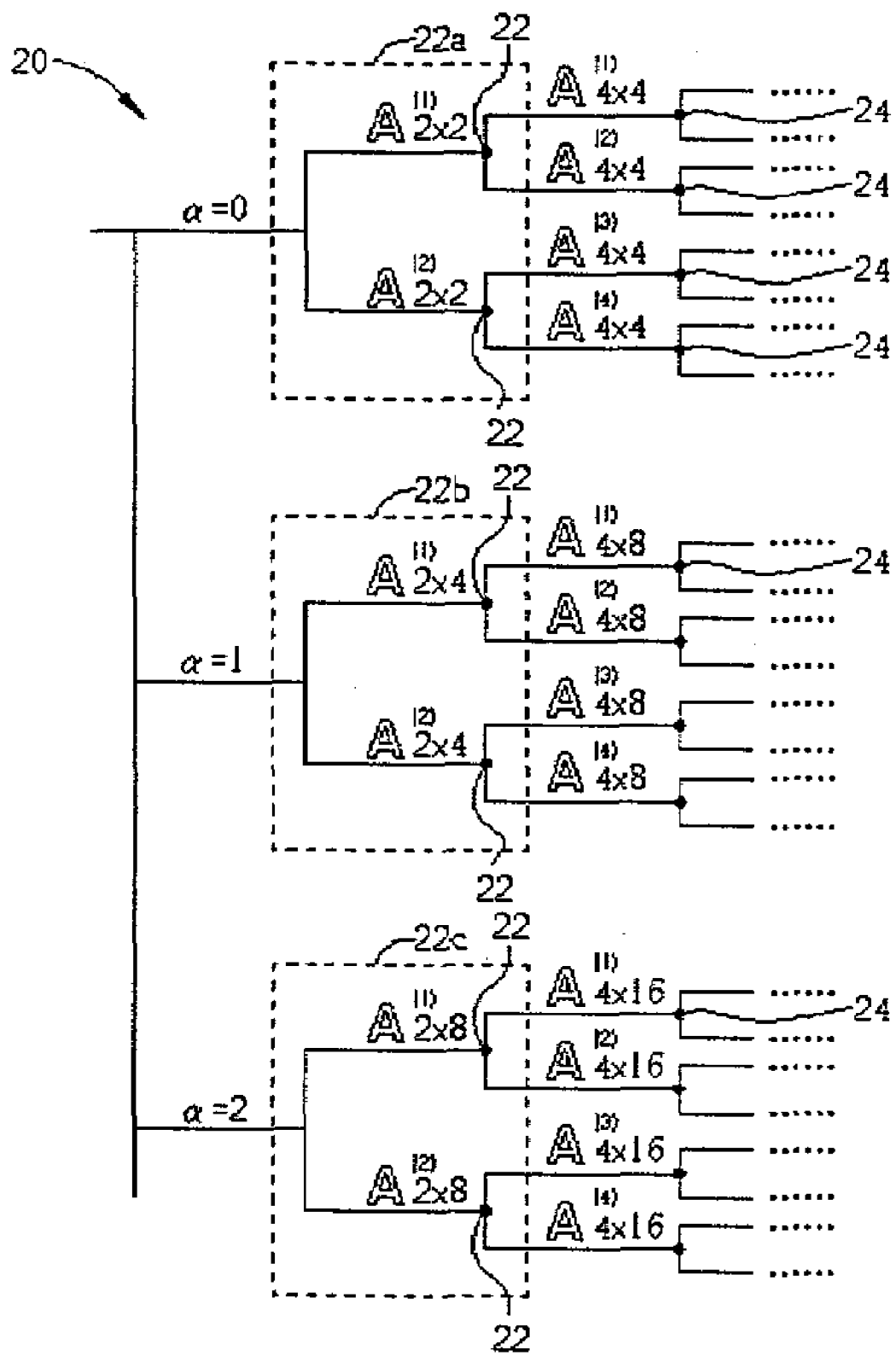
FIG. 2 illustrates a portion of a code tree of two-dimensional orthogonal variable spreading factor (2D-OVSF) codes according to the present invention.

Please refer to FIG. 2. FIG. 2 illustrates a portion of a code tree 20 of two-dimensional orthogonal variable spreading factor (2D-OVSF) codes according to the present invention for a multicarrier direct-sequence code-division multiple-access (MC-DS/CDMA) communications system. The highest level of the code tree 22 is composed of progenitor nodes 22. The progenitor nodes 22 are grouped into pairs, such as progenitor node pairs 22a, 22b and 22c. Each progenitor node 22 is the root node of a subsequent binary tree having a plurality of children nodes 24. Each node 22, 24 has an associated matrix for a 2D-OVSF code, which may be generally termed as $A^{(i)}(M\times N)$, where M is the number of rows in the matrix and relates to the number of frequency carriers in the MC-DS/CDMA communications system, and N is the number of columns in the matrix and represents the spreading factor utilized (i.e., the number of chips per data symbol). Each progenitor node 22 is characterized by a corresponding matrix having the generalized form of $A^{(i)}(2\times 2^{\alpha})$, where α is greater than or equal to one. Each pair of progenitor nodes 22, such as the progenitor node pairs 22a, 22b and 22c, share the same value of α. For example, progenitor node pair 22a contains two progenitor nodes 22 that respectively correspond to the matrices $A^{(1)}(2\times 2)$ and $A^{(2)}(2\times 2)$ (which are 2×2 matrices, so that α=1), progenitor node pair 22b contains two progenitor nodes 22 that respectively correspond to the matrices $A^{(1)}(2\times 4)$ and $A^{(2)}(2\times 4)$ (which are 2×4 matrices, so that α=2), progenitor node pair 22c contains two progenitor nodes 22 that respectively correspond to the matrices $A^{(1)}(2\times 8)$ and $A^{(2)}(2\times 8)$ (which are 2×8 matrices, so that α=3), etc. The upper limit of α is simply a design choice according to the maximum spreading factor desired of the MC-DS/CDMA communications system. Each child node 24 is characterized by a corresponding matrix having the generalized form of $A^{(i)}(2^k\times 2^{k+\alpha})$, where α is the of value of the progenitor node 22 of the child node 24, and k indicates the depth of the child node 24 within the code tree 20. For example, k=2 indicates that the child node 24 is an immediate child node 24 of a progenitor node 22, k=3 indicates that the child node 24 is a grandchild of the progenitor 22, etc. Note that k=1 is actually indicative of the progenitor nodes 22, and not the children nodes 24. For all matrices $A^{(i)}(M\times N)$, the superscript value (i) may range from 1 to M.

The code tree 20 is simply a convenient way to express the hierarchical nature of the 2D-OVSF codes, and their associated matrices, of the present invention. Generating the code tree 20 really means generating the matrices that are associated with the nodes 22 and 24 of the code tree 20. To generate these matrices, two sets of initial orthogonal binary matrices {$A^{(1)}(2\times2)$, $A^{(2)}(2\times2)$} and $B^{(1)}(2\times2)$, $B^{(2)}(2\times2)$ are provided, which are preferably Hadamard matrices. In particular, $A^{(1)}(2\times2)$ is orthogonal to $A^{(2)}(2\times2)$, and $B^{(1)}(2\times2)$ is orthogonal to $B^{(2)}(2\times2)$. The term "orthogonal" should be clear to those in the art. In particular, though, for general M×N matrices $C^{(1)}(M\times N)$ and $C^{(2)}(M\times N)$ to be asynchronous orthogonal, the following relationship must be true:

$$\Sigma_k \Sigma_l (c^{(1)}{}_{k,l} c^{(2)}{}_{k,l \oplus t}) = 0$$

Figure 3A:
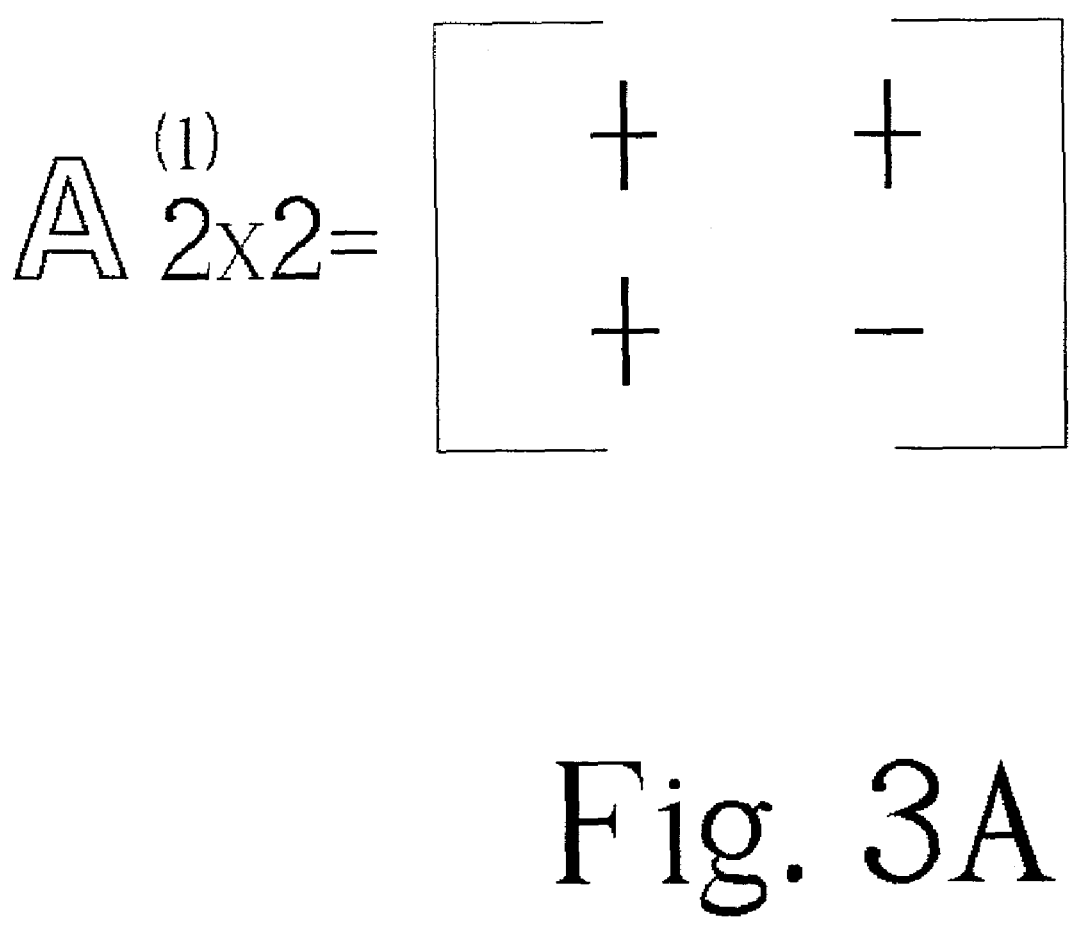
Figure 3B:
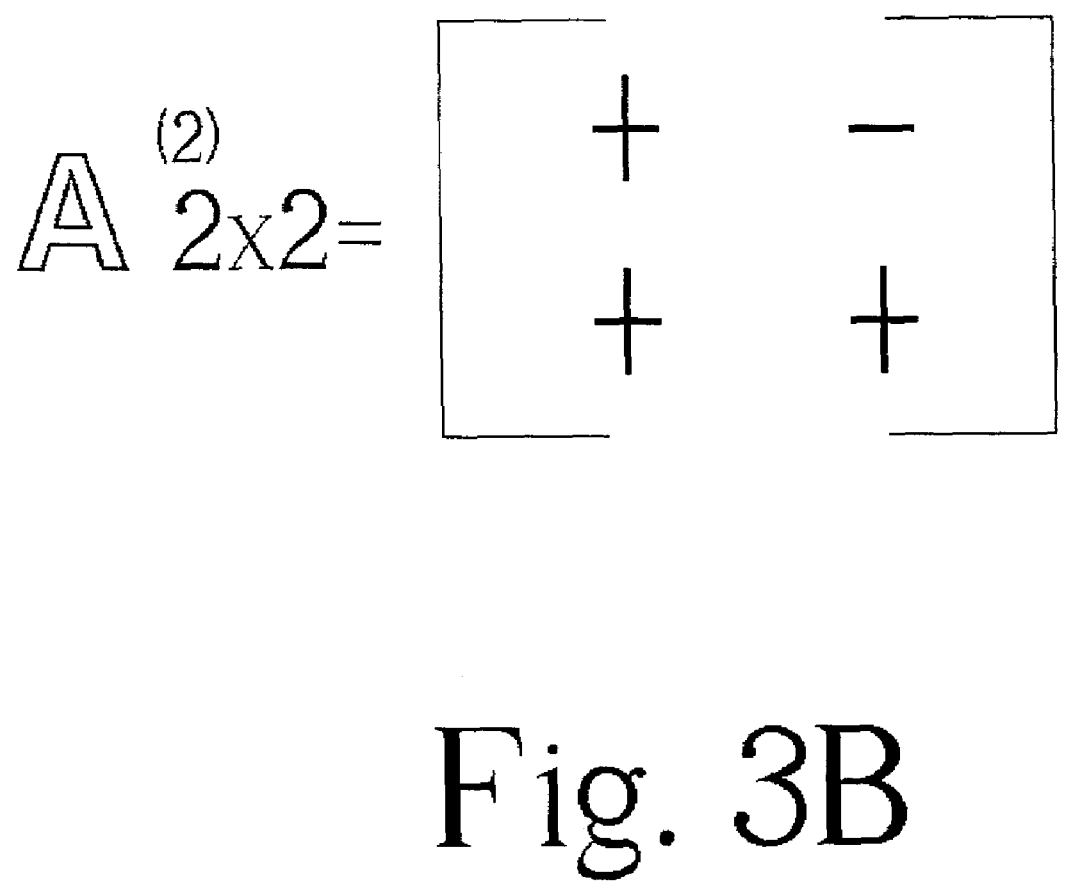
Figure 3D:
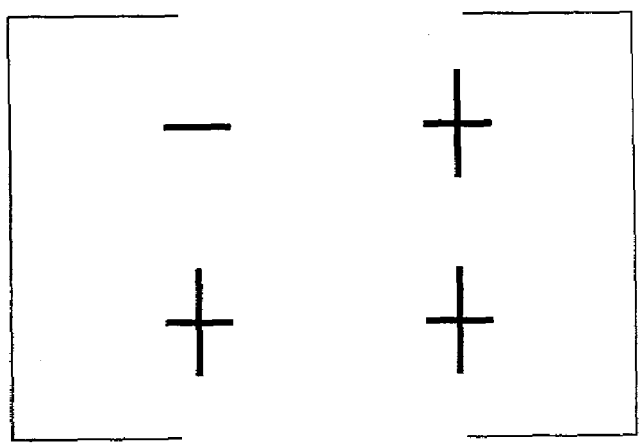

In which k sums up from zero to (M−1), l sums up from zero to (N−1), and $c^{(i)}{}_{k,l}$ indicates a matrix element in the $k^{th}$ row and $l^{th}$ column in the $i^{th}$ matrix. The subscript "t" indicates an integer time shift, and the symbol "⊕" indicates a modulo-N operation. An example of such a construction is depicted in FIGS. 3A to 3D. The "+" signs within the matrices of FIGS. 3A to 3D indicate a value of "+1", whereas the "−" signs indicate a value of "−1". As a particular solution, it is possible for the orthogonal set of matrices {$A^{(1)}(2\times2)$, $A^{(2)}(2\times2)$} to be equal to the orthogonal set of matrices {$B^{(1)}(2\times2)$, $B^{(2)}(2\times2)$}. In the following, for illustrative purposes only, the matrices of FIGS. 3A and 3B are assumed for both sets of orthogonal matrices {$A^{(1)}(2\times2)$, $A^{(2)}(2\times2)$} and {$B^{(1)}(\times2)$, $B^{(2)}(2\times2)$}. That is, in the following discussion it is assumed that $A^{(1)}(2\times2)=B^{(1)}(2\times2)$, and $A^{(2)}(2\times2)=B^{(2)}(2\times2)$. To obtain the pairs of progenitor nodes 22 (i.e., to obtain the matrices associated with these nodes 22), the following relationship is iterated:

$$A^{(1)}{}_{(2\times2^{1+\beta})} = [A^{(1)}{}_{(2\times2^{\beta})} A^{(2)}{}_{(2\times2^{\beta})}] \quad \text{Eqn. 1A}$$

$$A^{(2)}{}_{(2\times2^{1+\beta})} = [A^{(1)}{}_{(2\times2^{\beta})} - A^{(2)}{}_{(2\times2^{\beta})}] \quad \text{Eqn. 1B}$$

For example, with β=1 Eqns. 1A and 1B yield $A^{(1)}(2\times4)=[A^{(1)}(2\times2)A^{(2)}(2\times2)]$, which is depicted in FIG. 4A, and $A^{(2)}(2\times4)=[A^{(1)}(2\times2)-A^{(2)}(2\times2)]$, which is depicted in FIG. 4B. Similarly, β=2 yields $A^{(1)}(2\times8)=[A^{(1)}(2\times4)A^{(2)}(2\times4)]$, and $A^{(2)}(2\times8)=[A^{(1)}(2\times4)-A^{(2)}(2\times4)]$. Note that a "−A" simply converts every "+" in A to a "−", and vice versa. That is, as A is a binary matrix, negating A is simply equivalent to performing a logical NOT operation to each item within A. Clearly, by recursively iterating the above relationships of Eqns. 1A and 1B, it is possible to construct matrix pairs $A^{(1)}{}_{(2\times2^{\alpha})}$ and $A^{(2)}{}_{(2\times2^{\alpha})}$ having arbitrarily high values of α.

In the following, the symbol "⊕" is used to indicate a Kronecker product of two matrices. The Kronecker product of two general matrices A and B is shown in FIG. 5. In FIG. 5, matrix A is assumed to be an M×N matrix, consisting of matrix elements "$a_{m,n}$". If matrix B is an O×P matrix, then the Kronecker product A. B clearly yields an MO×NP matrix. To obtain successive generations of matrices for children nodes 24 of a progenitor node 22, the following relationships are iterated:

$$A^{(i-1)}{}_{(O\times P)} = [B^{(1)}{}_{(2\times2)} A^{(i/2)}{}_{(O/2\times P/2)}] \quad \text{Eqn. 2A}$$

$$A^{(i)}{}_{(O\times P)} = [B^{(2)}{}_{(2\times2)} A^{(i/2)}{}_{(O/2\times P/2)}] \quad \text{Eqn. 2B}$$

In the above Eqns.2A and 2B, "i" goes as 2, 4, 6, 8, . . . , O. For example, to obtain the matrices $A^{(i)}(4\times4)$, which correspond to first generation children nodes 24 of the progenitor node pair 22a, Eqns.2A and 2B are iterated with i=2, and i=4:

$A^{(1)}(4\times4)=[B^{(1)}(2\times2) \cdot A^{(1)}(2\times2)]$, shown in FIG. 6A;

$A^{(2)}(4\times4)=[B^{(2)}(2\times2) \cdot A^{(1)}(2\times2)]$, shown in FIG. 6B;

$A^{(3)}(4\times4)=[B^{(1)}(2\times2) \cdot A^{(2)}(2\times2)]$, shown in FIG. 6C; and $A^{(4)}(4\times4)=[B^{(2)}(2\times2) \cdot A^{(2)}(2\times2)]$, shown in FIG. 6D.

Note that in FIGS. 6A to 6D it is assumed that $A^{(1)}(2\times2)=B^{(1)}(2\times2)$ and that $A^{(2)}(2\times2)=B^{(2)}(2\times2)$. FIGS. 6A to 6D are consequently drawn as such, indicating only the matrices $A^{(1)}(2\times2)$ and $A^{(1)}(2\times2)$, rather than the matrices $B^{(1)}(2\times2)$ and $B^{(1)}(2\times2)$. In a similar vein, the matrices $A^{(i)}(4\times8)$ are found from Eqns.2A and 2B by:

$A^{(1)}(4\times8)=[B^{(1)}(2\times2) \cdot A^{(1)}(2\times4)]$, $A^{(2)}(4\times8)=[B^{(2)}(2\times2) \cdot A^{(1)}(2\times4)]$, $A^{(3)}(4\times8)=[B^{(1)}(2\times2) \cdot A^{(2)}(2\times4)]$, and $A^{(4)}(4\times8)=[B^{(2)}(2\times2) \cdot A^{(2)}(2\times4)]$.

Figure 7A:
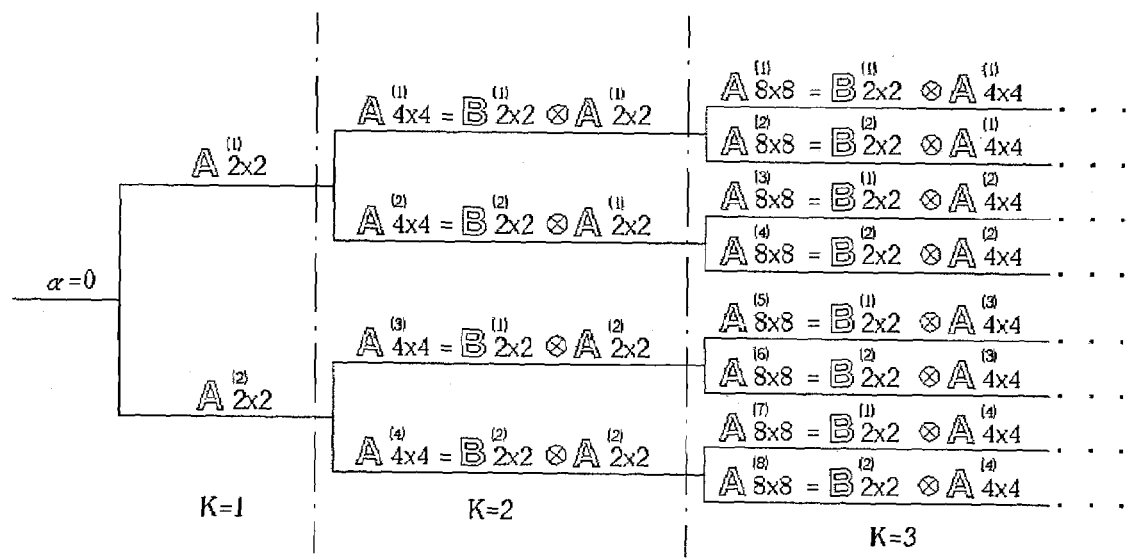
FIGS. 7A and 7B are mode detailed code tree diagrams of the code tree shown in FIG. 2.
Figure 7B:
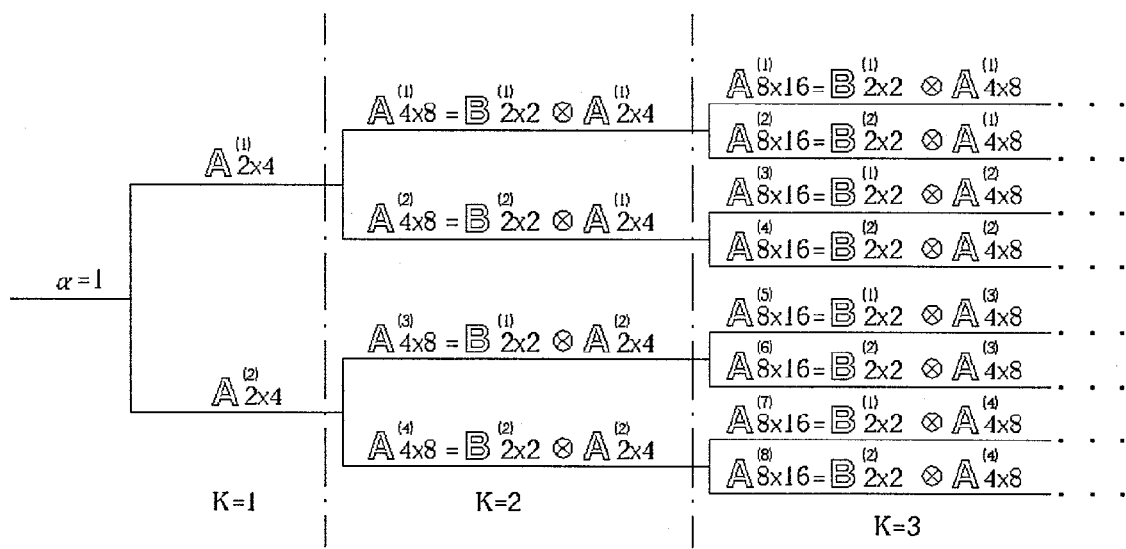

From the above, it should be clear that eqns.1A, 1B, 2A and 2B of the present invention enable the construction of 2D-OVSF code matrices that have the form M×N, where $M=2^k$ and $N=2^{k+\alpha}$. To find the matrices $A^{(i)}(M\times N)$ for M and N having particular values of k and α, Eqns.1A and 1B are first iterated α times to find the corresponding matrices of the progenitor node pairs 22. Eqns.2A and 2B are then recursively iterated to a code tree 20 depth of k to find the desired $A^{(i)}(M\times N)$ matrices. The recursive nature of matrices with those of their immediate parent nodes 22, 24 is shown in FIGS. 7A and 7B, which are partial trees diagram of the code tree 20 for α=0 and α=1, respectively. FIGS. 2–7B, in combination with Eqns.1A–2B, should make it clear how to construct any $A^{(i)}(M\times N)$ matrix of the present invention.

FIG. 2 shows the general tree structure 20 of 2D-OVSF codes as provided by the present invention method. FIG. 7A shows a detailed view of such 2D-OVSF codes where M=N, while FIG. 7B depicts a particular class of such codes with M<N, wherein α=1. As indicated previously, the code tree 20 is actually representative of matrices (which are the 2D-OVSF codes) of the form $2^k \times 2^{k+\alpha}$. The term "k" may be thought of as the generational class of the matrices, with those matrices having k=1 being termed progenitor matrices, k=2 children matrices, k=3 grandchildren matrices, etc. It is a characteristic of the present invention code tree 20 that codes at the same generational layer (i.e., having the same value of k) are orthogonal. Furthermore, any two codes at different generational layers (i.e., with different values of k) are also orthogonal to each other, unless one is the parent node of another. The term parent means any node 22, 24 in the code tree 20 that is in the path from a node 24 to the progenitor 22 (i.e., root) of that node 24. Similarly, a child of a first node 24 may be any node 24 for which the first node 24 serves as a parent node 24. Such terminology should be familiar to those in the art. For example, with reference to FIG. 7A, the matrices $A^{(1)}(2\times2)$, $A^{(2)}(4\times4)$, and $A^{(3)}(8\times8)$ are all not orthogonal to each other. Finally, with respect to a MC-DS/CDMA system, codes having a higher value of k and assigned as a signature sequence to a device represent lower data transmission rates than those codes having lower values of k. Hence, a device requiring high data transmission rates should be assigned a code 24 having a lower value of k, whereas a device that can get by with slower data transmission rates should be assigned a code 24 with a higher value of k.

Figure 8:
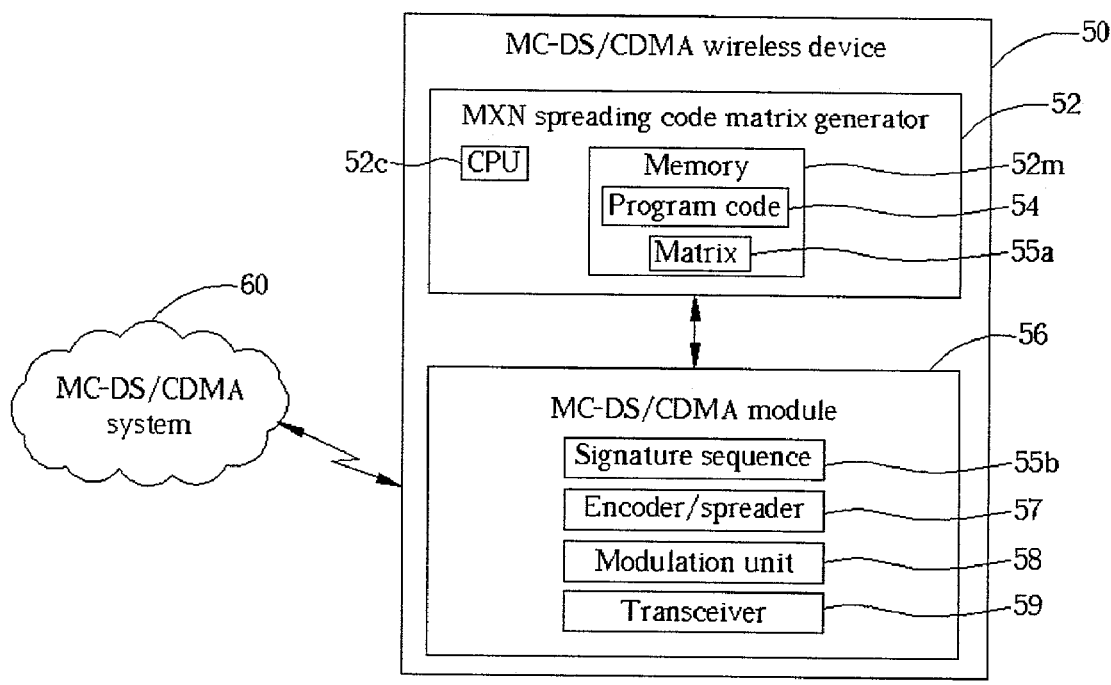
FIG. 8 is a block diagram of a MC-DS/CDMA-enabled device according to the present invention.

Please refer to FIG. 8. FIG. 8 is a block diagram of a MC-DS/CDMA-enabled device 50 according to the present invention for use in a provided MC-DS/CDMA system 60. The MC-DS/CDMA device 50 can be a base station or a mobile unit, and includes a standard MC-DS/CDMA module 56 to provide the MC-DS/CDMA capabilities of the device 50. In particular, the MC-DS/CDMA module 56 includes a transceiver 59 for sending and receiving radio signals, a modulation unit 58 for performing modulation and demodulation of transmitted and received signals, respectively; and an encoder/spreader for performing encoding and spreading of transmitted data, and decoding and de-spreading of received data, according to a signature sequence 55b. The signature sequence 55b can be represented by a matrix, and is provided by an M×N spreading code matrix generator 52. The M×N spreading code matrix generator 52 generates elements for a matrix 55a by utilizing the method disclosed above, and will typically include a central processing unit (CPU) 52c and a memory 52m. The memory 52m holds program code 54 that is executed by the CPU 52c, and which contains instructions for implementing the present invention M×N spreading code matrix generation method. The form of both the CPU 52c and the corresponding program code 54 is a design choice, and construction of the program code 54 should be a simple matter for a reasonably skilled programmer based upon the above disclosure. How matrices are represented internally within the memory 52m is also clearly a design choice. In particular, that the program code must contain at least the first set of orthogonal 2×2 matrices $\{A^{(1)}(2\times2), A^{(2)}(2\times2)\}$. It is certainly possible for the first set of orthogonal 2×2 matrices $\{A^{(1)}(2\times2), A^{(2)}(2\times2)\}$ to also serve as the second set of orthogonal 2×2 matrices $\{B^{(1)}(2\times2), B^{(2)}(2\times2)\}$. The program code 54 may either initially generate a portion of the code tree 20 for storage in the memory 52m and then select a node 22, 24 for the matrix 55a, or may simply generate a single matrix 55a on the fly according to a set of given parameters. The matrix 55a is then passed to the MC-DS/CDMA module 56 to serve as the signature sequence 55b of the device 50. The program code 54 can provide the matrix 55a having the generalized form of $A^{(i)}_{(2^k \times 2^{k+\alpha})}$, as discussed above, according to the parameters i, k and α. Appropriate selection of the parameters i, k and α, however, is extremely important for the overall functioning of the MC-DS/CDMA system 60, the details of which are beyond the scope of this invention. In general, however, it is necessary for every device in the MC-DS/CDMA system 60, including the device 50, to have orthogonal spreading code matrices (as represented by the nodes 22, 24). As the code tree 20 is common to all devices within the MC-DS/CDMA system 60, the signature sequence 55b generated by the matrix generator 52 should be one that is not a child node 24 of any already-assigned node 22, 24. Further, the tree-like structure 20 of spreading codes of the present invention makes it possible to take data transmission rate requirements of the device 50 into consideration. If the device 50 has low data rate requirements, codes 24 with high k values can be assigned, with the caveat that a greater number of such devices 50 can be simultaneously supported by the MC-DS/CDMA system 60, as a greater number of such orthogonal high-k codes 24 are available to the system 60. Similarly, if the device 50 has high data rate requirements, such as streaming video or the like, then the device 50 should be assigned a signature sequence 55b with a lower value of k, with the corresponding caveat that fewer such devices 50 can be simultaneously supported by the MC-DS/CDMA system 60, as all the children codes 24 of such an assigned code 22, 24 are no longer available to the system 60 for assignment to a device. Because of the truly orthogonal nature of the codes 22, 24 provided by the present invention, a two-layered spreading scheme is no longer required, while, due to the tree-like structure of the codes 22, 24, multirate transmissions are intrinsically supported.

With respect to the above, it is generally a base station that will assign a signature sequence to a mobile unit (typically termed "user equipment", or simply "UE"). In this case, it is not necessary for the UE to generate the signature sequence. Instead, the base station can generate the appropriate signature sequence for a UE, and then transmit the signature sequence to the UE, which the UE then adopts for its signature sequence.

In contrast to the prior art, the present Invention provides a method for generating a code tree of spreading codes that are truly orthogonal, and which supports multirate transmission capabilities. The 2D-OVSF spreading codes of the present invention are of a generalized $2^k \times 2^{k+\alpha}$ form, with k greater than or equal to one, and α greater than or equal to zero. Hence, the prior art limitations of having only M×M or M×M² matrices is removed, providing a corresponding increase to flexibility as regards MC-DS/CDMA systems. The present invention 2D-OVSF codes can be utilized in MC-DS/CDMA systems to support wireless devices at a variety of data rates.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for wireless communications comprising:
providing a multicarrier direct-sequence code-division multiple-access (MS-DS/CDMA) communications system;
generating a code tree of two-dimensional orthogonal variable spreading factor (2D-OVSF) codes, wherein each node of the code tree has a corresponding matrix;
selecting an M×N matrix from a node of the code tree, where M relates to the number of available frequency carriers in the MS-DS/CDMA system, N relates to a spreading factor, $M=2^k$, $N=2^{k+\alpha}$, k is greater than zero, and α is greater than or equal to zero; and
assigning the M×N matrix to a MS-DS/CDMA-enabled device of the MS-DS/CDMA system to serve as a signature sequence of the device;
wherein generating the code tree comprises:
providing a first set of orthogonal 2×2 matrices $$\{A^{(1)}_{(2\times2)}, A^{(2)}_{(2\times2)}\};$$

providing a second set of orthogonal 2×2 matrices $$\{B^{(1)}_{(2\times2)}, B^{(2)}_{(2\times2)}\};$$

utilizing the first set of 2×2 matrices to generate a pair of progenitor nodes in the code tree that respectively represent matrices $A^{(1)}_{(2\times2^\alpha)}$ and $A^{(2)}_{(2\times2^\alpha)}$ by iterating the relationship:

$$A^{(1)}\{2\times2^{i+1}\} = [R^{(1)}\{2\times2^i\}A^{(2)}\{2\times2^i\}],$$
$$A^{(2)}\{2\times2^{i+1}\} = [A^{(1)}\{2\times2^i\} - A^{(2)}\{2\times2^i\}];$$

utilizing the matrices $A^{(1)}_{(2\times2^\alpha)}$ and $A^{(2)}_{(2\times2^\alpha)}$ to generate a child node of one of the progenitor nodes, the child node having the M×N matrix, by iterating the relationship:

$$A^{(i-1)}{}_{(O \times P)} = [B^{(1)}{}_{(2 \times 2)} A^{(i/2)}{}_{(O/2 \times P/2)}],$$

$$A^{(i)}{}_{(O \times P)} = [B^{(2)}{}_{(2 \times 2)} A^{(i/2)}{}_{(O/2 \times P/2)}];$$

wherein is a Kronecker product, and children nodes of the code tree correspond to data transmission rates that are slower than those of parent nodes, thereby transmitting multirate transmissions by utilizing orthogonal matrices in the code tree.

2. The method of claim 1 wherein children nodes of the progenitor nodes are in the form of a binary tree.

3. The method of claim 1 wherein $\alpha$ is greater than zero.

4. The method of claim 1 wherein the first set of orthogonal 2×2 matrices is identical to the second set of orthogonal 2×2 matrices.

5. The method of claim 1 wherein any two matrices at an identical layer in the code tree are orthogonal to each other, and any two matrices at different layers in the code tree are orthogonal if and only if one of the matrices is not the parent code of the other matrix.

6. A wireless communications device comprising:
  a multicarrier direct-sequence code-division multiple-access (MS-DS/CDMA) module for providing MC-DS/CDMA functionality to the wireless device according to a signature sequence; and
  a memory for storing a code tree of two-dimensional orthogonal variable spreading factor (2D-OVSF) codes that are capable of serving as the signature sequence, the 2D-OVSF codes each expressible as an M×N matrix $A^{(i)}{}_{(M \times N)}$ in which M relates to the number of available frequency carriers available to the wireless device, N relates to a spreading factor, $M=2^k$, $N=2^{k+\alpha}$, k is greater than zero, i ranges from one to M, and $\alpha$ is greater than or equal to zero, the 2D-OVSF codes of the code tree being interrelated by:

$$A^{(1)}(2 \times 2^{i+1}) = [A^{(1)}(2 \times 2^i) A^{(2)}(2 \times 2^i)],$$
$$A^{(2)}(2 \times 2^{i+1}) = [A^{(1)}(2 \times 2^i) - A^{(2)}(2 \times 2^i)],$$
$$A^{(i-1)}_{(O \times P)} = [B^{(1)}_{(2 \times 2)} \otimes A^{(i/2)}_{(O/2 \times P/2)}], \text{ and}$$
$$A^{(i)}_{(O \times P)} = [B^{(2)}_{(2 \times 2)} \otimes A^{(i/2)}_{(O/2 \times P/2)}],$$

wherein is a Kronecker product, $A^{(1)}{}_{(2 \times 2)}$ is orthogonal to $A^{(2)}{}_{(2 \times 2)}$, and $B^{(1)}{}_{(2 \times 2)}$ is orthogonal to $B^{(2)}{}_{(2 \times 2)}$; and
  wherein children nodes of the code tree correspond to data transmission rates that are slower than those of parent nodes, thereby transmitting multirate transmissions by utilizing orthogonal matrices in the code tree.

7. The wireless device of claim 6 wherein $\alpha$ is greater than zero.

8. The wireless device of claim 6 wherein $A^{(1)}{}_{(2 \times 2)}$ equals $B^{(1)}{}_{(2 \times 2)}$, and $A^{(2)}{}_{(2 \times 2)}$ equals $B^{(2)}{}_{(2 \times 2)}$.

9. A method for providing a signature sequence to a mobile unit in a multicarrier direct-sequence code-division multiple-access (MS-DS/CDMA) communications system, the method comprising:

a base station generating an M×N matrix according to a matrix generation method;
  the base station transmitting the M×N matrix to a mobile device; and
  the mobile device utilizing the M×N matrix to serve as a signature sequence of the mobile device;
wherein the matrix generation method comprises:
  providing a first set of orthogonal 2×2 matrices $$\{A^{(1)}_{(2 \times 2)}, A^{(2)}_{(2 \times 2)}\};$$

providing a second set of orthogonal 2×2 matrices $$\{B^{(1)}_{(2 \times 2)}, B^{(2)}_{(2 \times 2)}\}$$

utilizing the first set of 2×2 matrices to generate a pair of progenitor nodes in a code tree that respectively represent matrices $A^{(1)}{}_{(2 \times 2^\alpha)}$ and $A^{(2)}{}_{(2 \times 2^\alpha)}$ by iterating the relationship:

$$A^{(1)}{}_{(2 \times 2^{1+\beta})} = [A^{(1)}{}_{(2 \times 2^\beta)} A^{(2)}{}_{(2 \times 2^\beta)}],$$

$$A^{(2)}{}_{(2 \times 2^{1+\beta})} = [A^{(1)}{}_{(2 \times 2^\beta)} - A^{(2)}{}_{(2 \times 2^\beta)}]; \text{ and}$$

utilizing the matrices $A^{(1)}{}_{(2 \times 2^\alpha)}$ and $A^{(2)}{}_{(2 \times 2^\alpha)}$ to generate a child node of one of the progenitor nodes, the child node having the M×N matrix, by iterating the relationship:

$$A^{(i-1)}{}_{(O \times P)} = [B^{(1)}{}_{(2 \times 2)} A^{(i/2)}{}_{(O/2 \times P/2)}],$$

$$A^{(i)}{}_{(O \times P)} = [B^{(2)}{}_{(2 \times 2)} A^{(i/2)}{}_{(O/2 \times P/2)}];$$

wherein is a Kronecker product, and children nodes of the code tree correspond to data transmission rates that are slower than those of parent nodes, thereby transmitting multirate transmissions by utilizing orthogonal matrices in the code tree.

10. The method of claim 9 wherein children nodes of the progenitor nodes are in the form of a binary tree.

11. The method of claim 9 wherein $\alpha$ is greater than zero.

12. The method of claim 9 wherein the first set of orthogonal 2×2 matrices is identical to the second set of orthogonal 2×2 matrices.

13. The method of claim 9 wherein any two matrices at an identical layer in the code tree are orthogonal to each other, and any two matrices at different layers in the code tree are orthogonal if and only if one of the matrices is not the parent code of the other matrix.

* * * * *